(12) United States Patent
Ehlers

(10) Patent No.: US 7,421,980 B1
(45) Date of Patent: Sep. 9, 2008

(54) PET COLLAR WITH DECORATIONS

(76) Inventor: Kristen Smith Ehlers, c/o Schweitzer Cornman Gross & Bondell LLP, 292 Madison Ave. - 19th Floor, New York, NY (US) 10017

( * ) Notice: Subject to any disclaimer, the term of this patent is extended or adjusted under 35 U.S.C. 154(b) by 37 days.

(21) Appl. No.: 11/446,934

(22) Filed: Jun. 5, 2006

(51) Int. Cl.
*A01K 29/00* (2006.01)

(52) U.S. Cl. ..................................... 119/858

(58) Field of Classification Search .............. 119/858, 119/850, 856, 863, 907, 769, 792–795; D30/151, D30/152, 155
See application file for complete search history.

(56) References Cited

U.S. PATENT DOCUMENTS

| | | | | |
|---|---|---|---|---|
| 4,178,879 A | * | 12/1979 | Cunningham | 119/858 |
| 4,218,991 A | * | 8/1980 | Cole | 119/654 |
| 5,233,942 A | * | 8/1993 | Cooper et al. | 119/792 |
| 5,355,839 A | * | 10/1994 | Mistry | 119/858 |
| 5,503,114 A | * | 4/1996 | Castagna | 119/858 |
| 5,540,188 A | * | 7/1996 | Heinrichs | 119/770 |
| 5,970,921 A | * | 10/1999 | Fulton | 119/858 |
| 6,286,463 B1 | * | 9/2001 | Sykes | 119/858 |
| 6,422,177 B1 | * | 7/2002 | Noguero | 119/856 |

* cited by examiner

*Primary Examiner*—Thomas Price
(74) *Attorney, Agent, or Firm*—Schweitzer Cornman Gross & Bondell LLP

(57) ABSTRACT

A pet collar in which a leash attachment is connected to a back edge of the collar band, at a location generally opposite to the collar buckle, and extends rearwardly from the back edge, leaving the entire area of the collar band unobstructed by the leash attachment. Decorative elements can be attached to the collar in the region of the leash attachment, either directly or by means of a slide strip, without visual obstruction by, or mechanical interference from the leash attachment. The pet owner thus has a clear view the decorative elements when walking the pet on a leash.

4 Claims, 2 Drawing Sheets

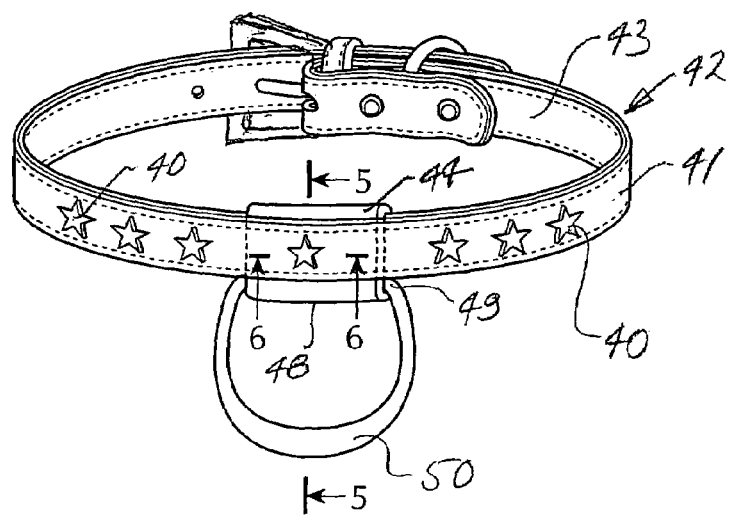
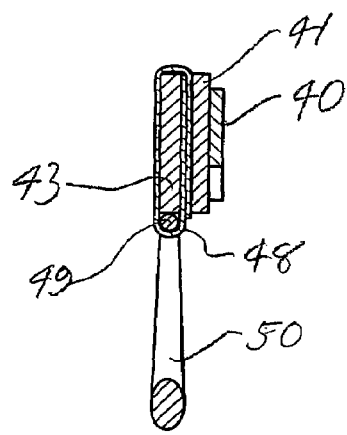
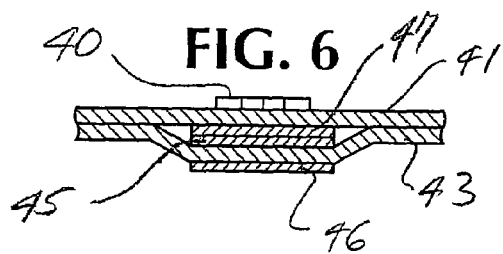

PET COLLAR WITH DECORATIONS

BACKGROUND OF INVENTION

Pet collars are commonly formed of leather or other flexible material provided at one end with a buckle or similar fastener that allows the collar to be placed around the pet's neck and adjustably secured to fit comfortably on the pet. Most typically, the collar is provided with a D-ring or the like, which is secured transversely to the collar, usually in the vicinity of the buckle, providing means for attaching a leash.

Many pet owners like to adorn the pet's collar with decorations, such as rhinestones, etc., to give the collar a classier appearance. The adornments can be fastened directly to the collar, or in many cases preferably are attached to a slide strip. The slide strip is a narrow length of leather or the like on which adornments may be mounted, either permanently or by a slide-on attachment. The collar is provided with a pair of spaced-apart studs which project outward from the collar and can be received in slotted openings at opposite ends of the slide strip. The slide strip is thus semi-permanently mounted on the collar and allows easy customization of the collar adornments.

One serious drawback with conventional pet collars is that the collar decorations commonly are on the side of the collar generally opposite the buckle, while the leash attachment ring typically is located near to the buckle. Accordingly, when the pet is on a leash, the leash attachment is at the top, while the decorations tend to be underneath the pet's neck, where they cannot be easily seen.

In some pet collars, a special D-ring is attached to the collar opposite the buckle, by being grommeted, riveted, or otherwise secured to the middle of the collar. This enables adornments to be attached to the collar, on either side of the D-ring mount. While this is an improvement over the standard collar, the arrangement does not accommodate the use of a slide strip for mounting of adornments and also becomes an interruption of the continuity of adornments. Such a discontinuity is undesirable where the adornments consist of letters spelling the pet's name, for example.

SUMMARY OF INVENTION

The present invention is directed to a novel and improved pet collar in which a novel and improved form of leash attachment is provided, which is located on the collar band at a position generally opposite the buckle or other closure provided for the collar but which does not form an interruption or discontinuity for collar adornments. Importantly, the leash attachment is secured at the back edge of the collar and extends rearwardly away from the collar for engagement by a leash. The outer surfaces of the collar in the region of the leash attachment are thus free of obstruction, such that the collar band can receive decorative elements in a continuous manner over the surface of the collar with no interruption by the leash attachment. Likewise, with the new leash attachment, slide strips may be mounted on the collar, without obstruction or interference from the leash attachment. The pet owner thus has full and complete freedom as to the manner in which the collar may be decorated, without limitation as to whether the decorations are to be mounted directly on the collar or by the use of a slide strip.

In one preferred embodiment of the invention, the leash attachment may comprise a D-ring or the like, which is pivotally secured at the back edge of the collar by means of a secondary band of material which is wrapped transversely around the collar band. The secondary band may be of the same material as the collar or may be other material, preferably flexible, that forms a loop at the back edge of the collar for engagement of the D-ring.

A typical quality pet collar may have a collar band having inner and outer layers of material, such as leather, secured together, for example by stitching. For collars of such construction, the secondary band may advantageously be extended between the inner and outer layers and around the bottom or inner surface of the inner layer. This arrangement leaves the outer surface of the outer layer uninterrupted, which may be preferred in cases where the adornments are to be attached directly to the collar band and not by way of a slide strip.

For a more complete understanding of the above and other features and advantages of the invention, reference should be made to the following detailed description of the preferred embodiments of the invention, and to the accompanying drawings.

DESCRIPTION OF THE DRAWINGS

FIG. 4 is a perspective view of a second embodiment of the invention, in which the outer surface of the collar band is uninterrupted and decorations are mounted directly on the collar band.

FIG. 5 is a cross-sectional view as taken generally on line 5-5 of FIG. 4.

FIG. 6 is a fragmentary cross-sectional view as taken generally on line 6-6 of FIG. 4.

DESCRIPTION OF PREFERRED EMBODIMENTS

Figure 1:
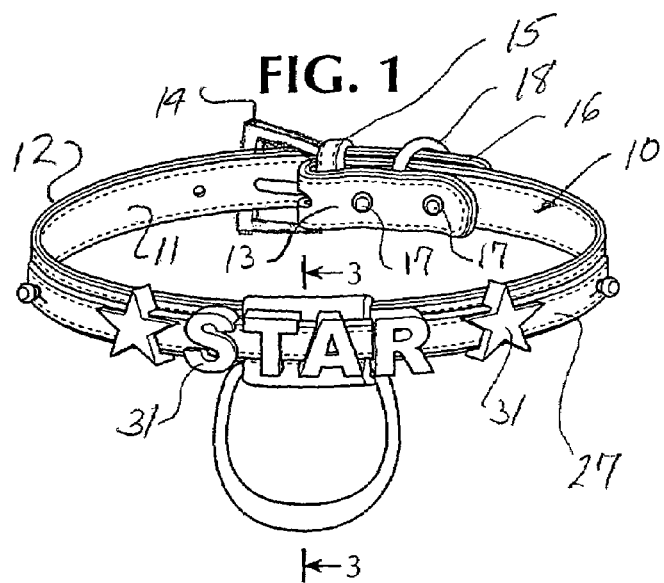
FIG. 1 is a perspective view of a pet collar incorporating a leash attachment according to the invention, illustrating the collar with adornments mounted by means of a slide strip.
Figure 3:
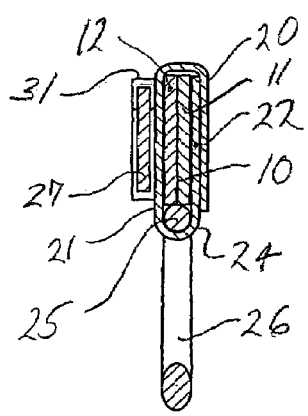
FIG. 3 is a cross-sectional view as taken generally on line 3-3 of FIG. 1.
Figure 2:
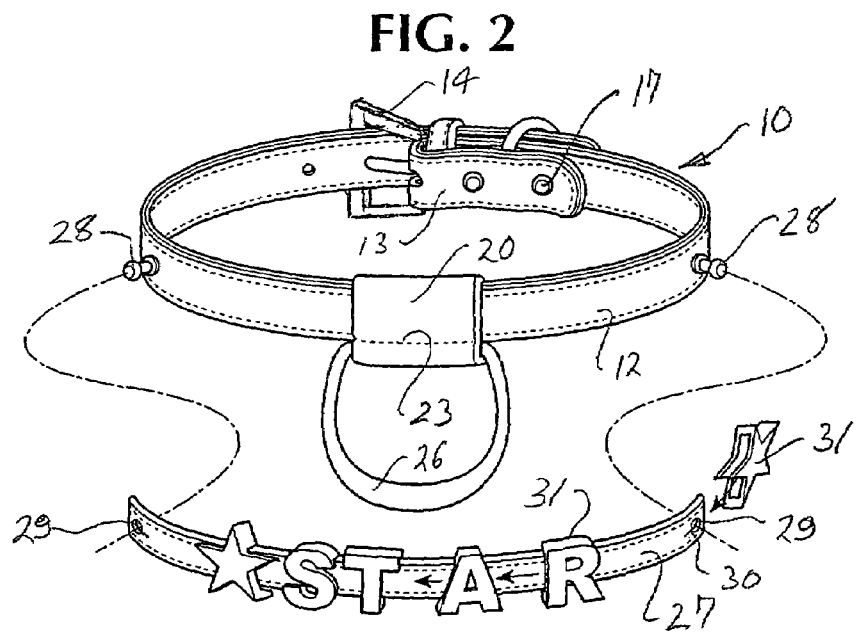
FIG. 2 is an exploded view of the collar of FIG. 1.

Referring now to the drawing, and initially to FIGS. 1-3 thereof, the reference numeral 10 designates generally a collar band, formed of a suitable flexible material. Typically, the collar band 10 is formed of leather, but it may also be formed of a variety of other suitable materials such as synthetic leathers, nylon, cotton, PVC, etc. In a high quality collar, the collar band 10 may be formed of inner and outer layers 11, 12 secured together, as by circumferential stitching. One end of the collar band is formed into a loop 13 to secure a buckle 14 and a tuck loop 15 to engage and receive the opposite end 16 of the collar band. The loop 13 may be secured by rivets 17.

In a conventional pet collar, a leash attachment ring 18 may be secured in the loop between the rivets 17, as shown. In the device of the present invention, the ring 18 is not used as a leash attachment, and is not necessary, but it may be convenient to retain the ring for attachment of identification tags, for example.

Pursuant to one aspect of the invention, a secondary band 20 is wrapped transversely about the collar band 10, at a location on the band generally opposite the buckle 14. The secondary band 20 may be of any suitable material, typically leather, in connection with a leather collar. As shown in FIG. 3, the secondary band includes an upper layer 21 and a lower layer 22. An extension of the upper layer is wrapped around the front edge of the collar band 10 and extends underneath the lower layer 22. The secondary band is secured in position by any suitable means, such as a line of stitching 23 (FIG. 2), adhesive, or other means.

Pursuant to the invention, the secondary band 20 forms a loop 24 at the back edge of the collar band to receive and confine an inner portion 25 of a D-ring 26. In the arrangement shown, the D-ring 26 is pivotally engaged by the loop 24 and extends rearwardly from the back edge of the collar.

With the leash attachment of the invention, the outer layer 12 of the collar band 10 is free and unobstructed in the area opposite the buckle 14. Accordingly, this area is free to carry adornments, which are visible to the pet owner while the pet is secured by a leash (not shown) attached to the D-ring 26.

One of the popular means of adorning a pet collar is through the use of a slide strip, such as shown at 27 in FIGS. 1 and 2. The slide strip is formed of a suitable flexible material, typically leather for a leather collar, and is provided with means at its opposite ends for securing the strip to the collar band. In the illustrated arrangement, which is typical, the collar is provided with spaced apart mushroom studs 28 arranged to be received in undersized openings 29 at opposite ends of the slide strip. The openings 29 may be provided with an expansion slit 30 at one side, enabling the openings to be forced over the mushroom studs and thereby semi-permanently secured to the collar band 10. In some cases, the slide strip may be permanently secured to the collar band.

Adornment elements 31, in the form of slide elements dimensioned to be received snugly onto the slide strip 27, are applied to the slide strip in any desired combination. In this respect, the slide strips themselves, and the slidable adornments therefor are well known in the trade and do not per se form a part of this invention. Importantly, however, the back edge securement of the leash attachment ring 26 allows the slide strip 27, with its adornments, to be mounted on the collar, generally opposite the collar buckle 14, while also providing for leash attachment generally opposite the buckle, but in a manner not interfering either visually or mechanically with the slide strip or its adornments.

It will be understood, of course, that a slide strip need not be utilized to apply adornments to the collar 10 shown in FIGS. 1 and 2. Instead, the adornments may be secured mechanically or adhesively to the outer layer 12 of the collar, and may extend continuously over the secondary band 20 so as to provide a continuous adornment visible at all times to the pet owner while walking the pet on a leash.

Referring now to FIGS. 4-6, a modified embodiment of the invention is shown in which decorative elements 40 are secured directly to the outer surface of the outer layer 41 of a collar band 42 consisting of inner and outer layers 41, 43 of flexible material, such as leather, etc. The collar band 42 of FIGS. 4-6 is structurally similar to the collar band of FIGS. 1-3, but differs therefrom in the manner of attachment of the secondary band 44. The upper layer 45 of the secondary band is extended between the upper and lower layers 41, 43 of the collar band, rather than over the top of the outer layer 41, as in the embodiment of FIGS. 1-3. The lower portion 46 of the secondary band is wrapped underneath the lower layer 43 of the collar band and an extension 47 may, if desired, be inserted between the two collar layers 41, 43. Secondary band 44, which is secured to the collar band in any suitable way, such as by adhesive means, stitching, or other means, forms a loop 48 at the back edge of the collar, which pivotally engages the inner portion 49 of a D-ring 50. If desired, the secondary band need not be wrapped around the collar band but can be sewn or otherwise attached without wrapping. The D-ring 50 extends rearwardly from the back edge of the collar, as shown, and is arranged for attachment to a leash (not shown).

In the arrangement of FIGS. 4-6, decorations 40 may be attached continuously along the outer surface of the outer collar band 41, including areas thereof in the immediate vicinity of the D-ring 50. When the collar is applied to the pet, and the pet is being walked on a leash, the decorative elements 40 are unobstructedly visible to the pet owner with no mechanical or visual conflict by the leash attachment means.

As will be understood, the leash attachment may be constructed in a variety of ways. By way of example, the D-ring 26, 50, need not be a metal ring, as is typical, but may be formed of plastic, flexible material such as fabric, etc. Likewise, attachment of the ring 26, 50, in whatever form, need not be by a wrapped-around secondary band, but may be by other means usually forming a loop at the back edge of the collar band. For example, a loop of material, which can be metal, fabric, etc., may capture the inner portion of the ring 26, 50, with ends being secured in between the layers of the collar band. Likewise, the attachment point need not be a ring captured by a loop, but could be a means such as a grommet inserted in a rearwardly projecting portion of a secondary element formed of flexible material, or simply a flexible loop of material extending rearwardly from the collar band with the loop itself forming means for attachment of a leash.

It thus should be understood that various modifications may be made to the specific forms of the invention herein specifically shown and described without departing from the clear teachings of the invention. Accordingly, reference should be made to the following appended claims in determining the full scope of the invention.

I claim:

1. A pet collar which comprises
   (a) a collar band formed of flexible material,
   (b) closure means on said collar band for securing the collar band to the neck of a pet animal in the form of a closed ring,
   (c) said collar band being rotatable around the neck of said animal when secured thereto,
   (d) a leash attachment located on said collar band at a position generally opposite to said closure means,
   (e) said leash attachment including an element having a first portion positioned closely adjacent to a back edge of said collar band and a second portion extending rearwardly away from said back edge for engagement by a leash,
   (f) outer surface portions of said collar band in the region of said leash attachment being substantially free of obstruction by said leash attachment, and
   (g) said collar band being adapted to receive decorative elements in portions of said collar band adjacent said leash attachment,
   (h) said leash attachment including a secondary band of material fixed to a portion of said collar band and defining a loop portion at said back edge,
   (i) said leash attachment further including a ring element,
   (j) said loop portion receiving and pivotally retaining a first portion of said ring element, and
   (k) a second portion of said ring element extending rearwardly from said loop portion for engagement with a leash.

2. A pet collar according to claim 1, wherein
   (a) said secondary band is wrapped around said collar band and fixed thereto.

3. A pet collar according to claim 2, wherein
   (a) said collar band comprises inner and outer layers of material secured together,
   (b) said secondary band has a first portion extending between said layers and a second portion extending underneath said inner layer of material.

4. A pet collar according to claim 1, wherein
   (a) a slide strip is secured at ends thereof to an outer side of said collar band on opposite sides of said leash attachment and extends along the collar band in the regions thereof adjacent to said leash attachment.

* * * * *